United States Patent
Jiang et al.

(10) Patent No.: US 12,190,609 B2
(45) Date of Patent: Jan. 7, 2025

(54) METHOD AND SYSTEM FOR MAP CONSTRUCTION

(71) Applicant: TUSIMPLE, INC., San Diego, CA (US)

(72) Inventors: Minhao Jiang, San Diego, CA (US); Hsin Lu, San Diego, CA (US); Genmao Shi, San Diego, CA (US); Ziqi Liu, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/360,556

(22) Filed: Jul. 27, 2023

(65) Prior Publication Data

US 2023/0410536 A1   Dec. 21, 2023

Related U.S. Application Data

(63) Continuation of application No. 17/405,397, filed on Aug. 18, 2021, now Pat. No. 11,721,112, which is a continuation of application No. 16/286,287, filed on Feb. 26, 2019, now Pat. No. 11,170,230.

(51) Int. Cl.
| | |
|---|---|
| G06V 20/56 | (2022.01) |
| G01C 21/32 | (2006.01) |
| G01S 19/48 | (2010.01) |
| G06F 16/29 | (2019.01) |
| G06T 7/11 | (2017.01) |
| G06T 7/73 | (2017.01) |
| G08G 1/16 | (2006.01) |

(52) U.S. Cl.
CPC .......... *G06V 20/588* (2022.01); *G01C 21/32* (2013.01); *G01S 19/48* (2013.01); *G06F 16/29* (2019.01); *G06T 7/11* (2017.01); *G06T 7/75* (2017.01); *G08G 1/167* (2013.01); *G06T 2207/30256* (2013.01)

(58) Field of Classification Search
CPC .......... G06V 20/56; G01C 21/32; G06T 7/73; G06T 7/11; G06T 7/10; G01S 19/48; G08G 1/16
See application file for complete search history.

(56) References Cited

U.S. PATENT DOCUMENTS

| | | |
|---|---|---|
| 6,118,404 A | 9/2000 | Fernekes et al. |
| 6,622,085 B1 | 9/2003 | Amita et al. |
| 7,127,107 B2 | 10/2006 | Kubota et al. |
| 8,612,138 B2 | 12/2013 | Yeh et al. |
| 9,170,116 B1 * | 10/2015 | Joshi .............. G01C 21/3837 |
| 9,684,977 B2 | 6/2017 | Ren |
| 10,803,635 B2 | 10/2020 | Jiang et al. |
| 11,170,230 B2 | 11/2021 | Jiang et al. |
| 2004/0212627 A1 | 10/2004 | Sumizawa et al. |

(Continued)

*Primary Examiner* — Tan Q Nguyen
(74) *Attorney, Agent, or Firm* — Perkins Coie LLP

(57) ABSTRACT

A method of retrieving a map includes receiving a grid data of the map comprising lane segments, wherein the grid data includes an array of grids each associated with a list including none or at least one of the lane segments intersecting the respective grid; receiving coordinates of a location; identifying a first grid including the location based on the grid data; identifying a target grid that has an associated list including at least one of the lane segments as first lane segment; and outputting the first lane segment.

20 Claims, 21 Drawing Sheets

(56) References Cited

U.S. PATENT DOCUMENTS

| | | |
|---|---|---|
| 2005/0100220 A1 | 5/2005 | Keaton et al. |
| 2007/0226243 A1 | 9/2007 | Fuki et al. |
| 2008/0262721 A1 | 10/2008 | Guo et al. |
| 2010/0231718 A1 | 9/2010 | Nakamori et al. |
| 2010/0266161 A1 | 10/2010 | Kmiecik et al. |
| 2011/0264529 A1* | 10/2011 | Conlan .............. G01S 19/19 |
| | | 715/764 |
| 2011/0280453 A1 | 11/2011 | Chen et al. |
| 2012/0065878 A1 | 3/2012 | Yeh et al. |
| 2012/0155745 A1 | 6/2012 | Park et al. |
| 2013/0322702 A1 | 12/2013 | Piemonte et al. |
| 2013/0328924 A1 | 12/2013 | Arikan et al. |
| 2014/0095062 A1 | 4/2014 | Wang et al. |
| 2014/0156182 A1* | 6/2014 | Nemec ................ G08G 1/16 |
| | | 701/461 |
| 2014/0172189 A1 | 6/2014 | Engel |
| 2015/0316386 A1* | 11/2015 | Delp ................ B60W 60/001 |
| | | 701/532 |
| 2015/0363645 A1 | 12/2015 | Chen et al. |
| 2016/0358349 A1 | 12/2016 | Dorum |
| 2017/0069092 A1 | 3/2017 | Bell |
| 2017/0294036 A1 | 10/2017 | Dorum |
| 2018/0082471 A1 | 3/2018 | Rodriguez et al. |
| 2018/0188043 A1 | 7/2018 | Chen et al. |
| 2018/0188743 A1 | 7/2018 | Wheeler |
| 2018/0329428 A1 | 11/2018 | Nagy et al. |
| 2019/0026591 A1 | 1/2019 | Fowe et al. |
| 2019/0035101 A1 | 1/2019 | Kwant et al. |
| 2019/0130182 A1 | 5/2019 | Zang et al. |
| 2020/0020104 A1 | 1/2020 | Mittal et al. |
| 2020/0167576 A1* | 5/2020 | Gonzalez ............ G06V 20/588 |
| 2020/0200547 A1* | 6/2020 | Miller ................ G01C 21/3815 |
| 2020/0210696 A1 | 7/2020 | Hou et al. |
| 2020/0272833 A1 | 8/2020 | Jiang et al. |
| 2020/0273219 A1 | 8/2020 | Jiang et al. |
| 2021/0012548 A1 | 1/2021 | Jiang et al. |
| 2021/0049780 A1* | 2/2021 | Westmacot ........... G01C 21/30 |
| 2021/0383137 A1 | 12/2021 | Jiang et al. |

* cited by examiner

METHOD AND SYSTEM FOR MAP CONSTRUCTION

CROSS-REFERENCE TO RELATED APPLICATIONS

This patent document is a continuation of U.S. patent application Ser. No. 17/405,397, filed on Aug. 18, 2021 and issued as U.S. Pat. No. 11,721,112, which is a continuation of and claims priority to and the benefit of U.S. patent application Ser. No. 16/286,287, filed Feb. 26, 2019 and issued as U.S. Pat. No. 11,170,230. The aforementioned patent applications are incorporated herein by reference in their entireties.

BACKGROUND

Mapmaking technology has developed for a long time. However, the balance between accuracy and cost is still a concern in this field. Finding a method of constructing an accurate map with less effort is a longstanding problem in the associated field.

SUMMARY OF THE INVENTION

One of the objectives of the present disclosure is to provide a method and an associated system to solve the aforementioned problem. With the method and the system disclosed by the present disclosure, the accuracy of the constructed map will be increased. With the increased accuracy of the map, navigation systems can be improved, and improved autopilot systems can be implemented.

According to an embodiment of the present disclosure, a method of retrieving a map is disclosed. The method includes receiving a grid data of the map comprising lane segments, the grid data comprising an array of grids each associated with a list including none or at least one of the lane segments intersecting the respective grid; receiving coordinates of a location; identifying a first grid including the location based on the grid data; identifying a target grid that has an associated list including at least one of the lane segments as a first lane segment(s); and outputting the first lane segment.

According to an embodiment of the present disclosure, a system for retrieving a map is disclosed. The map comprises lane segments based on a location. The system includes a database, a positioning circuit, a control circuit and an output circuit. The database includes a grid data of the map comprising lane segments, the grid data comprises an array of grids, and each grid is associated with a list including none or at least one of the lane segments intersecting the respective grid. The positioning circuit is arranged to receive coordinates of a location. The control circuit is arranged to identify a first grid including the location based on the grid data, and to identify a target grid that has an associated list including at least one of the lane segments as a first lane segment. The output circuit is arranged to output the first lane segment.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
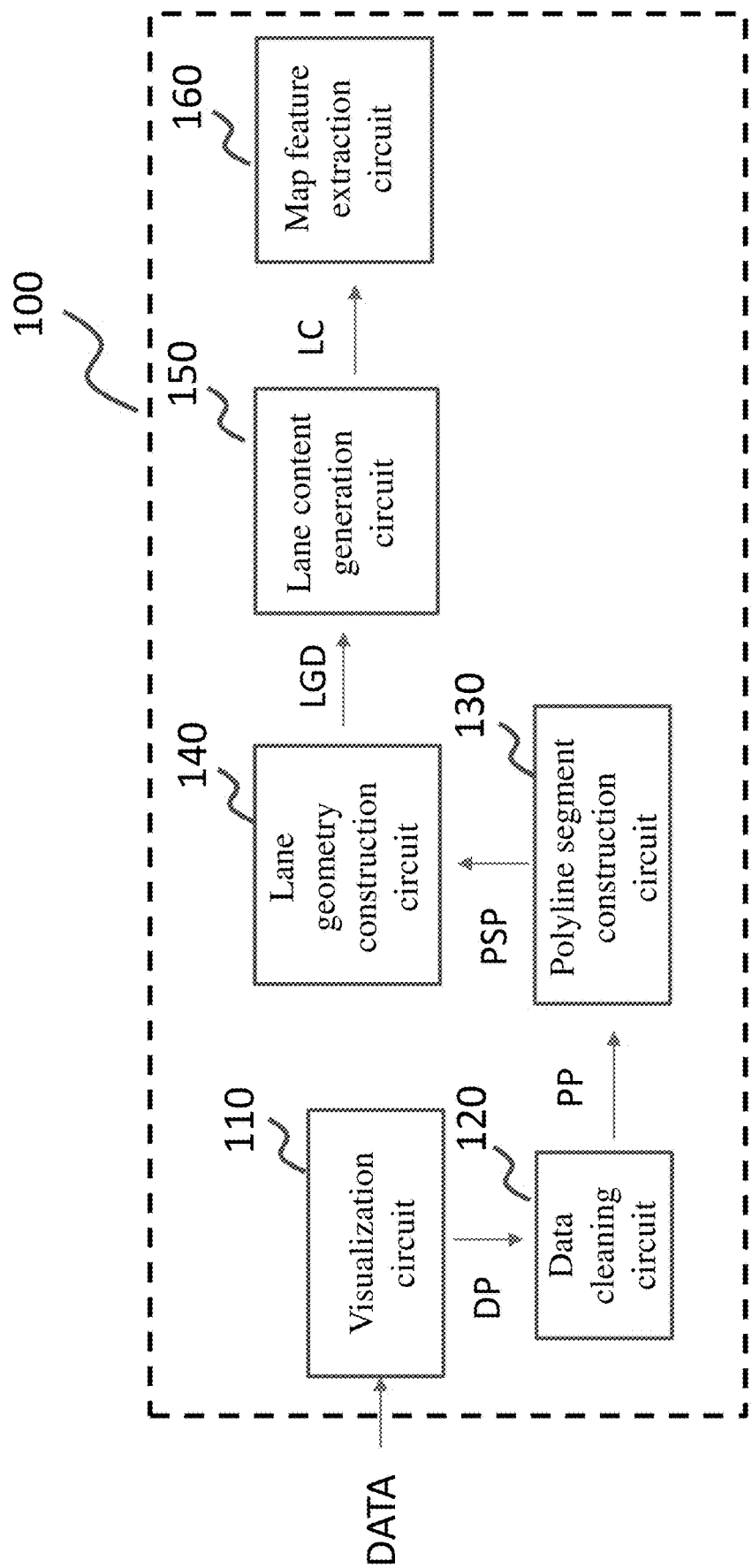
FIG. 1 is a diagram illustrating a system for constructing a map in accordance with an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a diagram illustrating a system 100 for constructing a map in accordance with some embodiments. The system 100 constructs the map according to a raw image data DATA. In some embodiments, the raw image data DATA is collected by an automobile which captures the street view on the road. In some embodiments, the raw image data DATA is collected further with the help of the global positioning system (GPS). In some embodiments, the automobile in particular captures the street view of a highway. As shown in FIG. 1, the system 100 includes a visualization circuit 110, a data cleaning circuit 120, a polyline segment construction circuit 130, a lane geometry construction circuit 140, a lane content generation circuit 150, and a map feature extraction circuit 160. In this embodiment, the visualization circuit 110, the data cleaning circuit 120, the polyline segment construction circuit 130, the lane geometry construction circuit 140, the lane content generation circuit 150, and the map feature extraction circuit 160 are implemented by hardware. However, in other embodiments, each circuit in the system 100 may be implemented by software or firmware, and such implementation should not be limited by the present disclosure.

Figure 2:
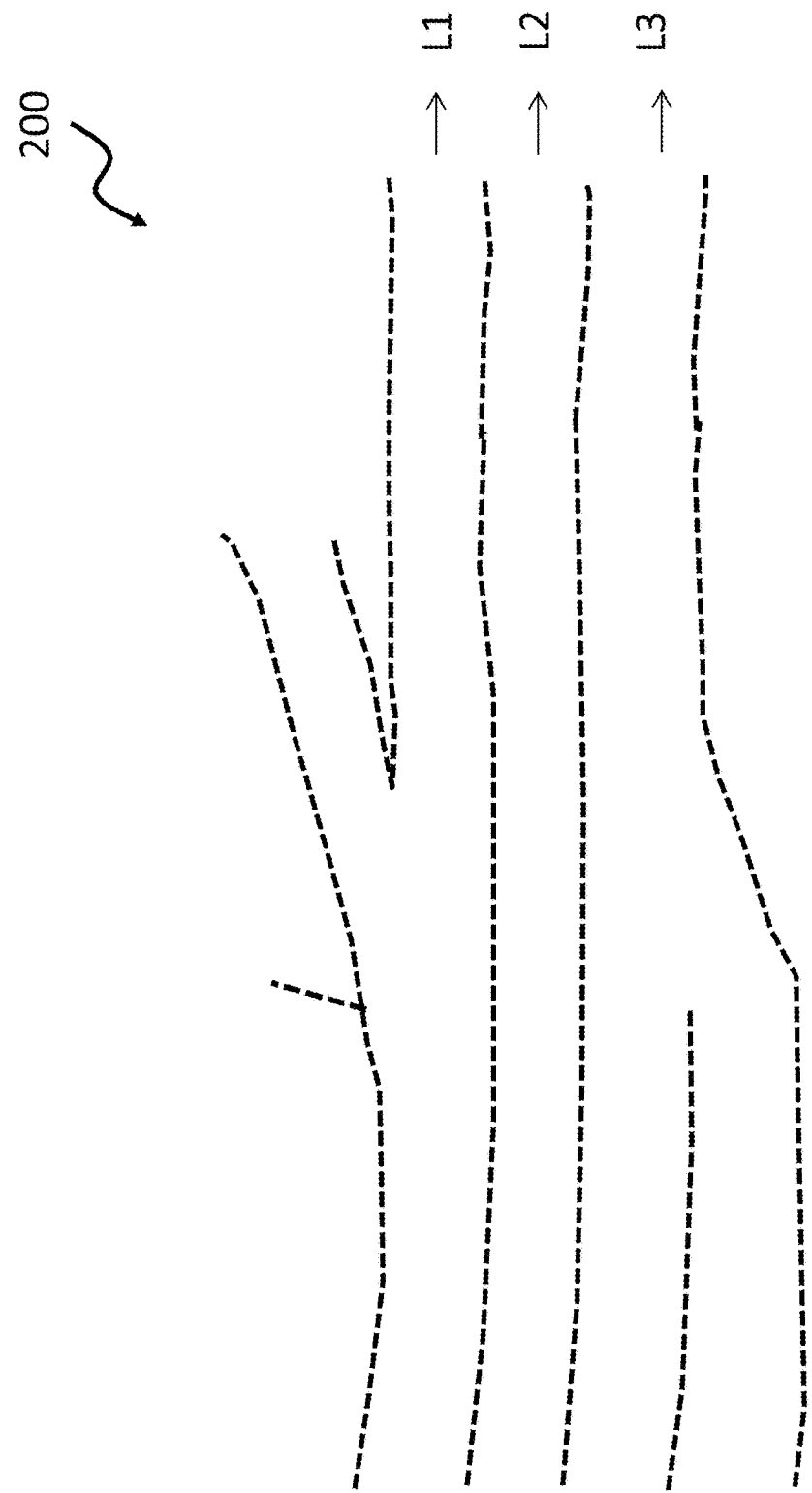
FIG. 2 is a diagram illustrating the shape of a road with dots in accordance with an embodiment of the present disclosure.

The visualization circuit 110 is arranged to receive the raw image data DATA, and generate a dotting plot DP according to the raw image data DATA. The dotting plot DP illustrates the shape of the road (e.g., a highway) with dots. FIG. 2 is a diagram illustrating the shape of a road 200 (e.g., a highway) with dots in accordance with an embodiment of the present disclosure. The shape of the road 200 illustrated by dots is generated by the visualization circuit 110 in accordance with the raw image data DATA, wherein the road 200 includes lanes L1 to L3.

Figure 3:
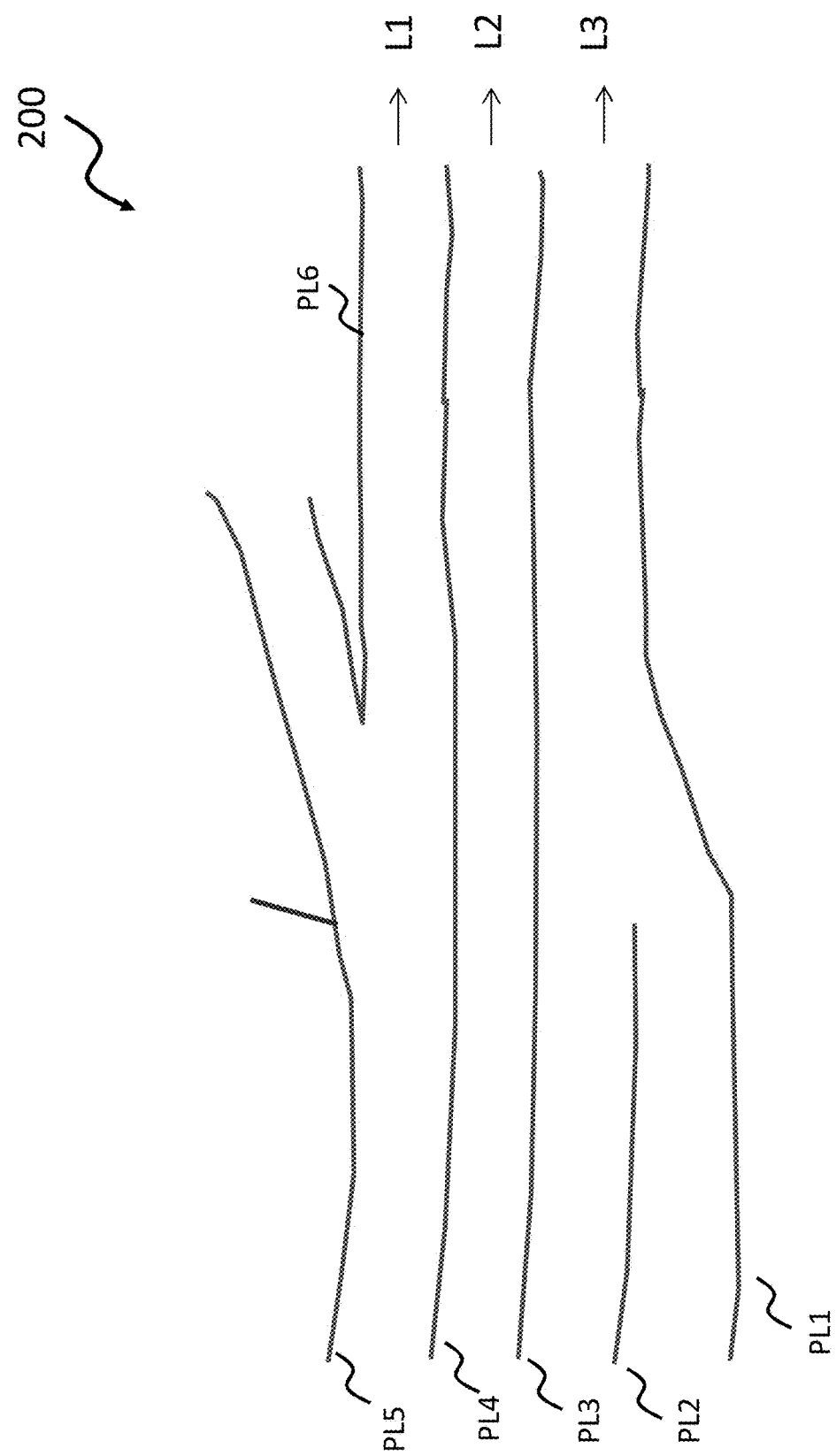
FIG. 3 is a diagram illustrating the shape of the road with polylines in accordance with an embodiment of the present disclosure.

Referring to FIG. 1 again, the data cleaning circuit 120 is arranged to receive the dotting plot DP and generate a polyline plot PP in accordance with the dotting plot DP. The dotting plot DP illustrates the shape of the road (e.g., a highway) with polylines. FIG. 3 is a diagram illustrating the shape of the road 200 with polylines in accordance with an embodiment of the present disclosure. The shape of the road 200 illustrated by polylines (e.g., polylines PL1 to PL6 as shown in FIG. 3) is generated by the data cleaning circuit 120 in accordance with the dotting plot DP.

Figure 4:
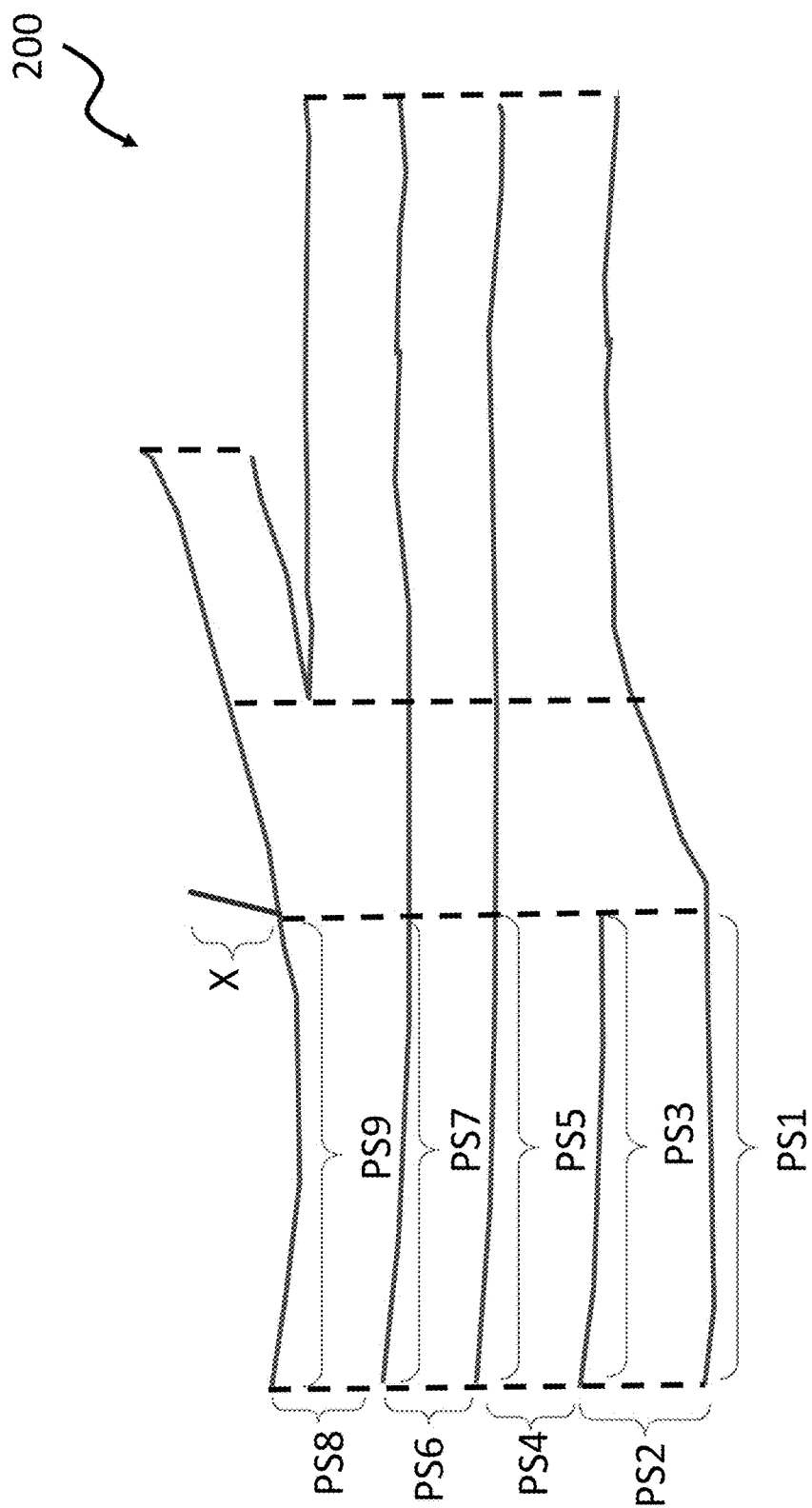
FIG. 4 is a diagram illustrating polyline segments in accordance with an embodiment of the present disclosure.

Referring to FIG. 1 again, the polyline segment construction circuit 130 is arranged to generate a polyline segment plot PSP by converting the polylines, e.g., the polylines PL1 to PL6, in the polyline plot PP into polyline segments, wherein the polyline segments are free of crossing one another. In some embodiments, the polyline segments are constructed on every start point, end point or turning point of the polylines. More specifically, each polyline is partitioned into at least one polyline segment, and a few vertical polyline segments are added on every start point, end point or turning point of the polylines. FIG. 4 is a diagram illustrating polyline segments in accordance with an embodiment of the present disclosure. As shown in FIG. 4, the polyline segment construction circuit 130 converts the polylines into polyline segments (e.g., polyline segments PS1 to PS9 shown in FIG. 4). In this embodiment, the left-hand side of FIG. 4 is determined as the front of each lane by the system 100. The right-hand side of FIG. 4 is determined as the back of each lane by the system 100. However, this is only for illustrative purposes, and such determination of lanes should not be limited by the present disclosure. In other embodiments, the right-hand side of FIG. 4 is determined as the front of each lane while the left-hand side of FIG. 4 is determined as the back of each lane. When the front and the back are determined, the left boundary and the right boundary of each lane can be easily determined by the system 100. For example, when the left-hand side of FIG. 4 is determined as the front of each lane and the right-hand side of FIG. 4 is determined as the back of each lane, the lower side of each lane in FIG. 4 is determined as the left boundary while the upper side of each lane in FIG. 4 is determined as the right boundary.

Referring to FIG. 1 again, the lane geometry construction circuit 140 is arranged to construct corresponding lane geometry data LGD based on the polyline segments (e.g., the polyline segments PS1 to PS9 shown in FIG. 4) for each of the lanes (e.g., the lanes L1 to L3). The lane content generation circuit 150 is arranged to generate a lane content LC for the respective lane based on the lane geometry data LGD, wherein the lane content LC includes graphical representation of lanes, the waypoints of the lanes, or some auxiliary factors for the respective lane which will be described in the following paragraphs. In some embodiments, part of the lane content, such as the graphical representation of lanes, may be determined and provided by the lane geometry construction circuit 140. The detailed description of the operations of the lane geometry construction circuit 140 and the lane content generation circuit 150 will be described in the following paragraphs.

Figure 5:
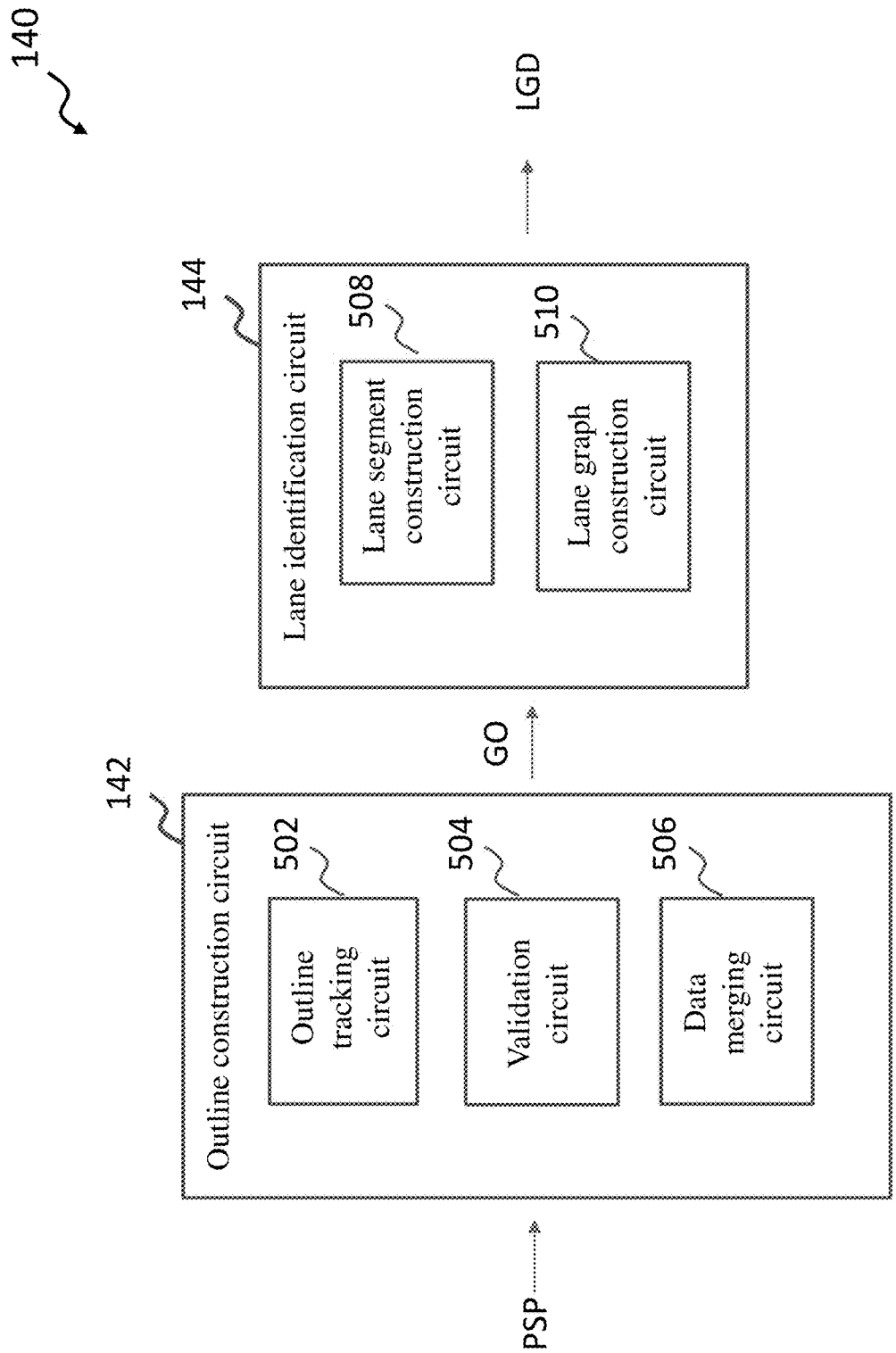
FIG. 5 is a diagram illustrating a lane geometry construction circuit in accordance with an embodiment of the present disclosure.

FIG. 5 is a diagram illustrating the lane geometry construction circuit 140 in accordance with an embodiment of the present disclosure. As shown in FIG. 5, the lane geometry construction circuit 140 includes an outline construction circuit 142 and a lane identification circuit 144. The outline construction circuit 142 is arranged to construct a general outline GO circumscribing the lanes (e.g., all of the lanes L1 to L3 to be identified) based on the polyline segments (e.g., PS1 to PS9), wherein the general outline GO forms a closed space circumscribing the lanes (e.g., L1 to L3). The lane identification circuit 144 is arranged to identify individual outlines of each of the plurality of lanes based on the plurality of polyline segments and the general outline GO, and further arranged to generate the lane geometry data LGD. The outline construction circuit 142 includes an outline tracking circuit 502, a validation circuit 504 and a data merging circuit 506. The lane identification circuit 144 includes a lane segment construction circuit 508 and a lane graph construction circuit 510.

Figure 6A:
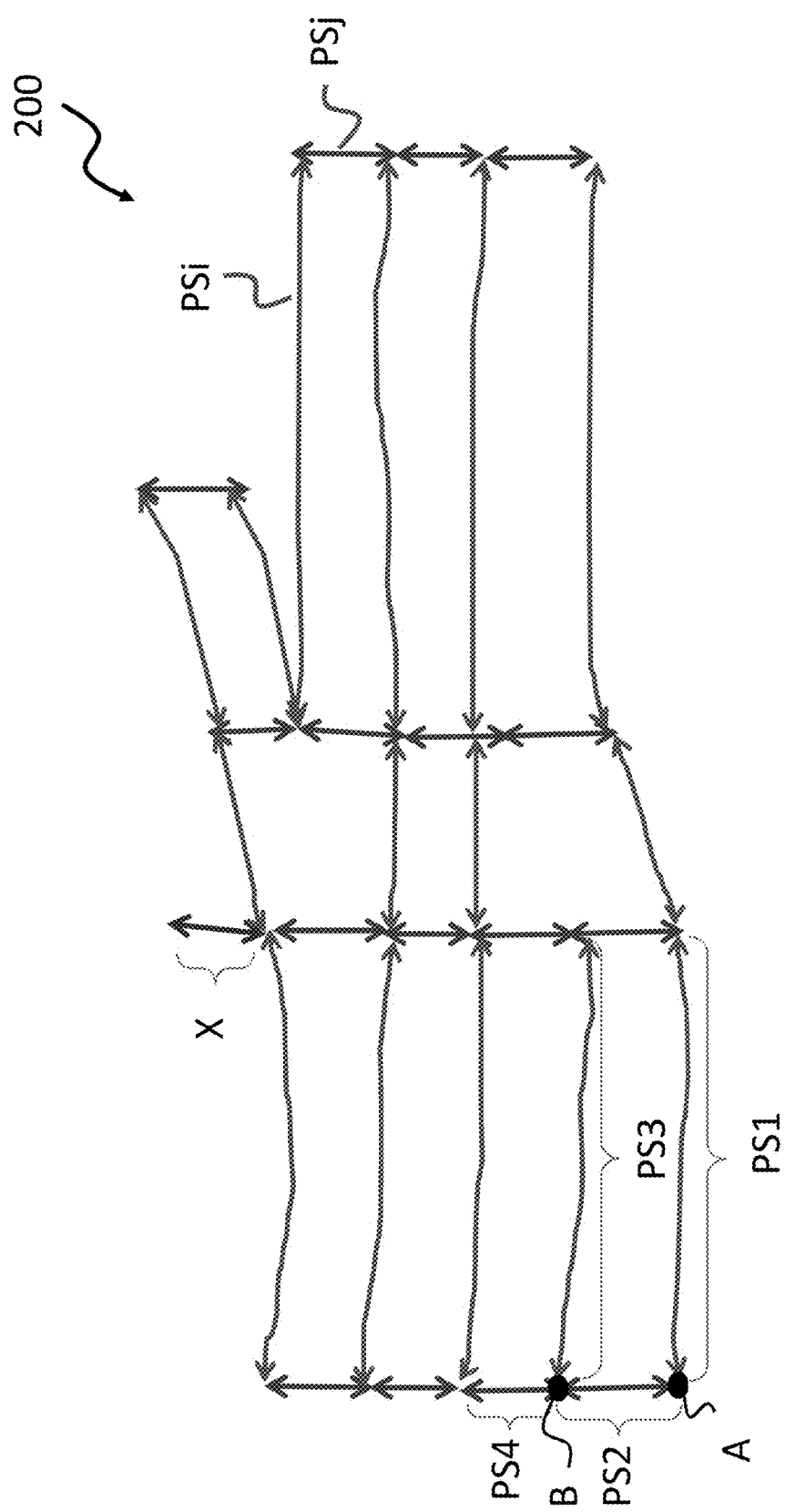
FIG. 6A to FIG. 6C are diagrams illustrating the operations of the outline tracking circuit, the validation circuit and the data merging circuit in accordance with an embodiment of the present disclosure.
Figure 6B:
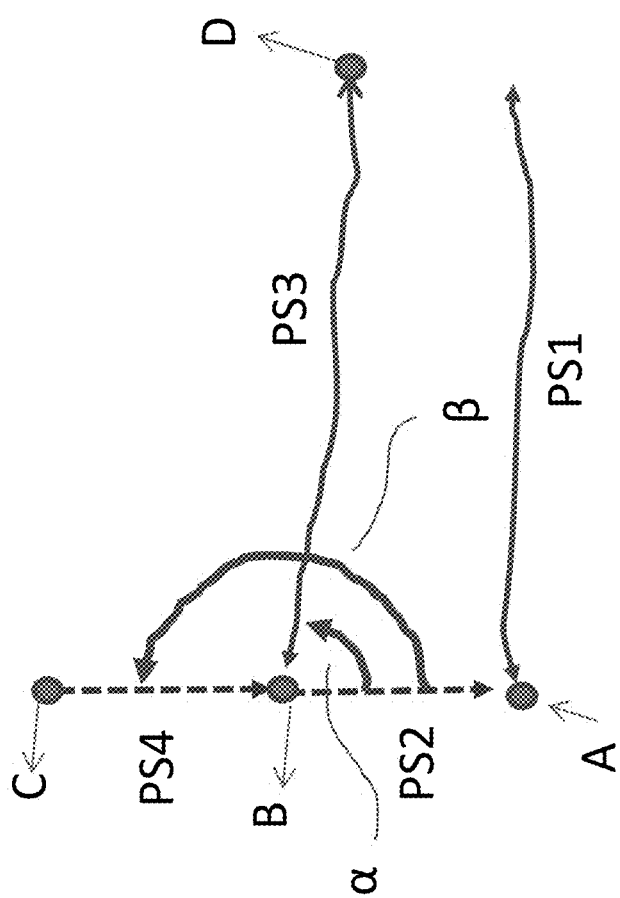
Figure 6C:
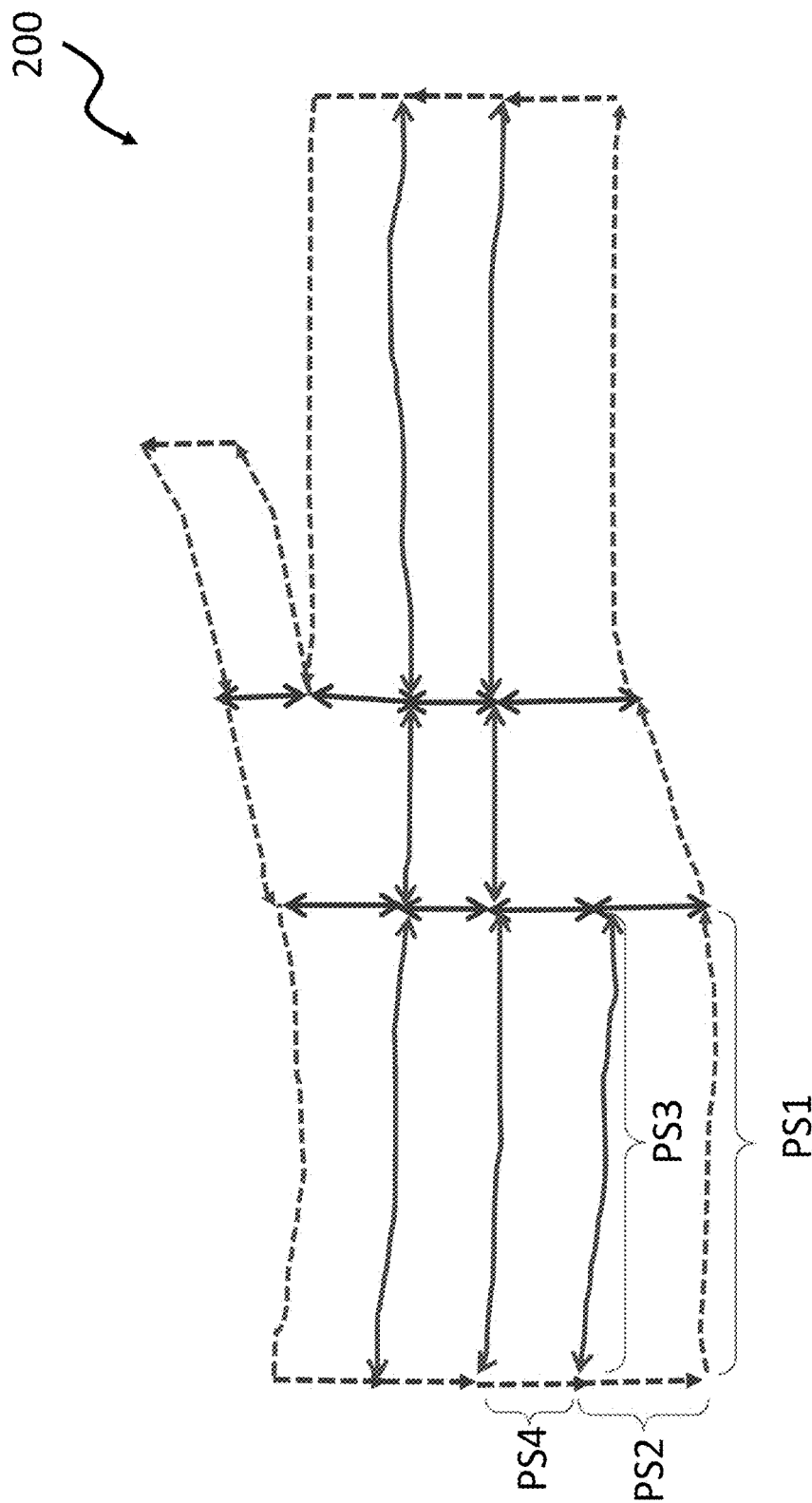

FIG. 6A to FIG. 6C are diagrams illustrating the operations of the outline tracking circuit 502, the validation circuit 504 and the data merging circuit 506, respectively, in accordance with an embodiment of the present disclosure. The outline tracking circuit 502 is arranged to select outline polyline segments as boundaries of the general outline GO from the plurality of polyline segments. First, a reverse polyline segment is added on each polyline segment. As shown in FIG. 6A, each polyline segment is marked as a bidirectional polyline segment, or equivalently represented by two fully overlapped polyline segments with opposite directions as indicated by the respective arrows. Second, a polyline segment is selected from the polyline segments (e.g., the polyline segments PS1 to PS9 as shown in FIG. 4) as an incident polyline segment. The indices of the incident polyline segment are included in the general outline GO, and the incident polyline has a first end and a second end opposite to the first end. More specifically, the incident polyline segment is selected as that having a smallest coordinate among the polyline segments (e.g., the polyline segments PS1 to PS9 as shown in FIG. 4). For example, in FIG. 6A, the polyline segment PS2 is selected as the incident polyline segment. The polyline segment PS2 includes two end points A and B. At the end point B, several candidate polyline segments are identified. For example, the polyline segments PS3 and PS4 are connected to the end point B. Therefore, the polyline segments PS3 and PS4 are identified as the candidate polyline segments for the incident polyline segment.

Next, one of the candidate polyline segments (e.g., one of the polyline segments PS3 and PS4) is selected as a target polyline segment. The target polyline segment is included in the general outline GO. FIG. 6B illustrates the operation of selecting one of the candidate polyline segments as the target polyline segment. At the end point B, representative included angles between each of the candidate polyline segments (e.g., the polyline segments PS3 and PS4) and the incident polyline segment (e.g., the polyline segment PS2) are compared. Each of the representative included angles is calculated counterclockwise from the incident polyline segment, and the candidate polyline segment having a maximal included angle is selected as the target polyline segment. For example, when calculating counterclockwise, the angle (e.g., the angle α) between the incident polyline segment (e.g., the polyline segment PS2) and the candidate polyline segment (e.g., the polyline segment PS3) is smaller than the angle (e.g., the angle β) between the incident polyline segment (e.g., the polyline segment PS2) and the candidate polyline segment (e.g., the polyline segment PS4). Therefore, the polyline segment PS4 is selected as the target polyline segment, wherein the indices of the target polyline segment are also included in the general outline GO. In contrast, when calculating clockwise, the candidate polyline segment having a minimal included angle is selected as the target polyline segment.

Meanwhile, the invalid polyline segment from the polyline segments is removed. The validation circuit 504 is arranged to remove the invalid polyline segment from the polyline segments. The invalid polyline segment is defined as a polyline segment that has one end point that is not connected to any other one of the polyline segments. For example, referring to FIG. 6A again, one end point of the polyline segment X is not connected to any other polyline segment. Therefore, the polyline segment X is identified as an invalid polyline segment and is removed by the validation circuit 504.

Optionally, at least two joined polyline segments are merged into a single polyline segment in response to determining that each the at least two joined polyline segments merge at only one respective end. The data merging circuit 506 is arranged to optionally merge said at least two joined polyline segments. Referring to FIG. 6A again, the polyline segments PSi and PSj are joined at only one respective end. Therefore, the data merging circuit 506 merges the polyline segments PSi and PSj into a single polyline segment.

Referring to FIG. 6B again, when the target polyline segment is determined at the end point B of the polyline segment PS2, the arrow pointing from the end point A toward the end point B is removed from the polyline segment PS2; that is, only the arrow pointing from the end point B toward the end point A of the polyline segment PS2 remains. When the polyline segment PS4 is selected as the target polyline segment, the next target polyline segment for the polyline segment PS4 is determined at the end point C. Therefore, the arrow pointing from the end point B toward the end point C is removed from the polyline segment PS4; that is, only the arrow pointing from the end point C toward the end point B of the polyline segment PS4 remains, and so on.

When the outline polyline segments are selected as boundaries of the general outline GO by the outline tracking circuit 502, the invalid polyline segment is removed by the validation circuit 504, and at least two joined polyline segments are optionally merged into a single polyline segment by the data merging circuit 506. As a result, the general outline GO is constructed as shown in FIG. 6C.

Referring to FIG. 5, again, after the general outline GO is constructed, the lane identification circuit 144 takes over the following operations, wherein the lane segment construction circuit 508 is arranged to construct a plurality of lane segments constituting each of the lanes (e.g., the lanes L1 to L3), and the lane graph construction circuit 510 is arranged to construct a graph representation of the plurality of lanes.

Figure 7A:
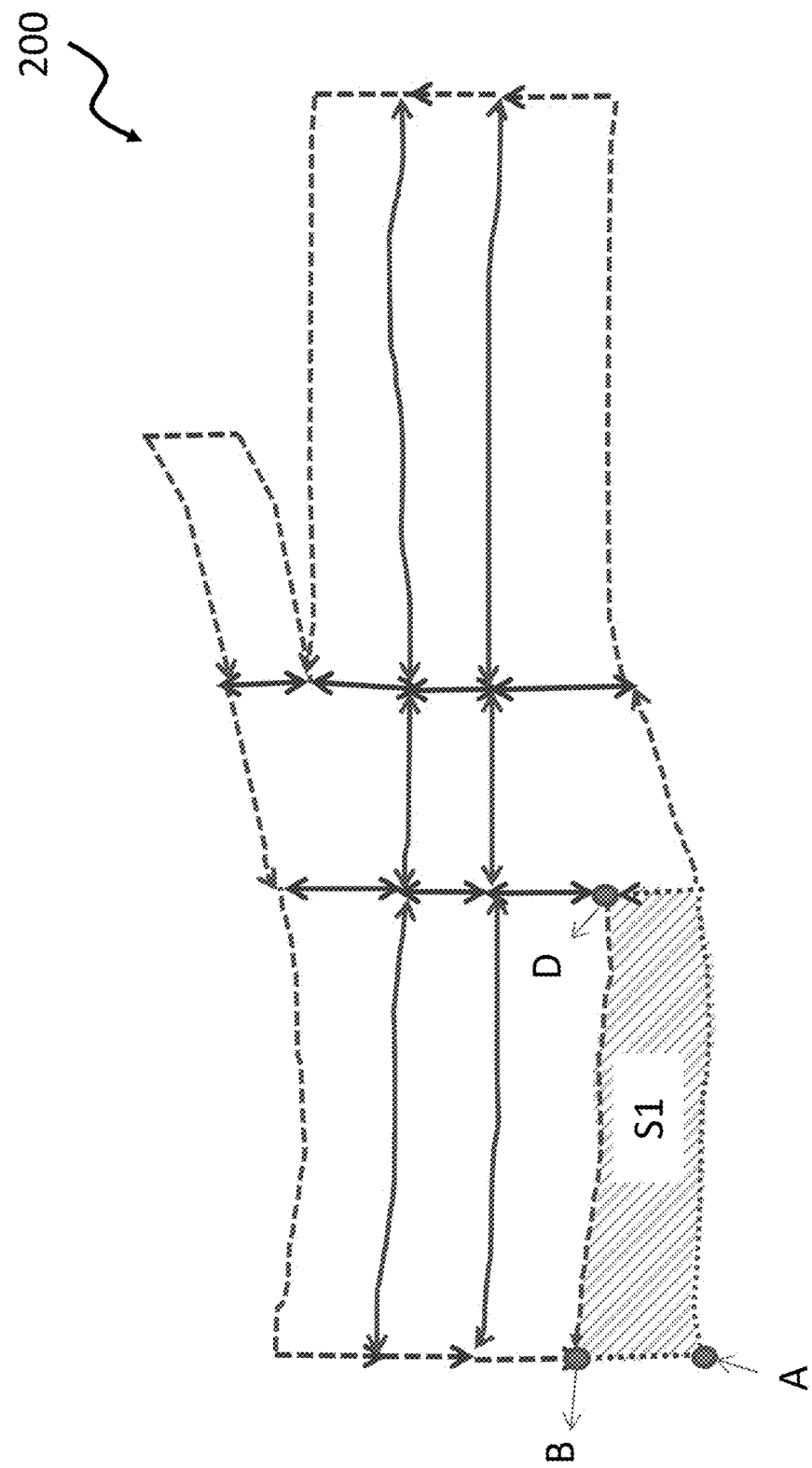
FIG. 7A to FIG. 7C are diagrams illustrating the operations of the lane segment construction circuit and the lane graph construction circuit in accordance with an embodiment of the present disclosure.
Figure 7B:
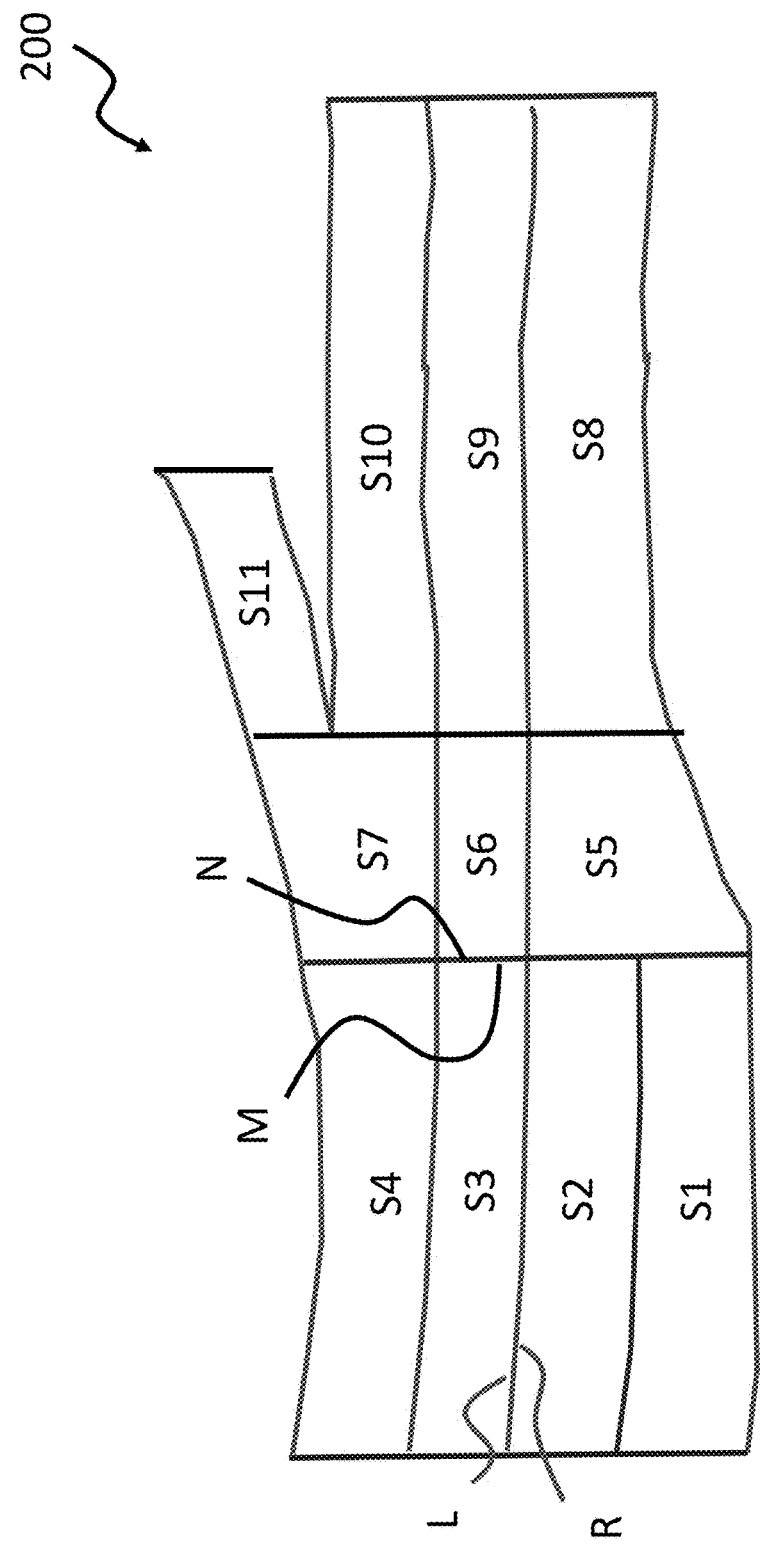
Figure 7C:
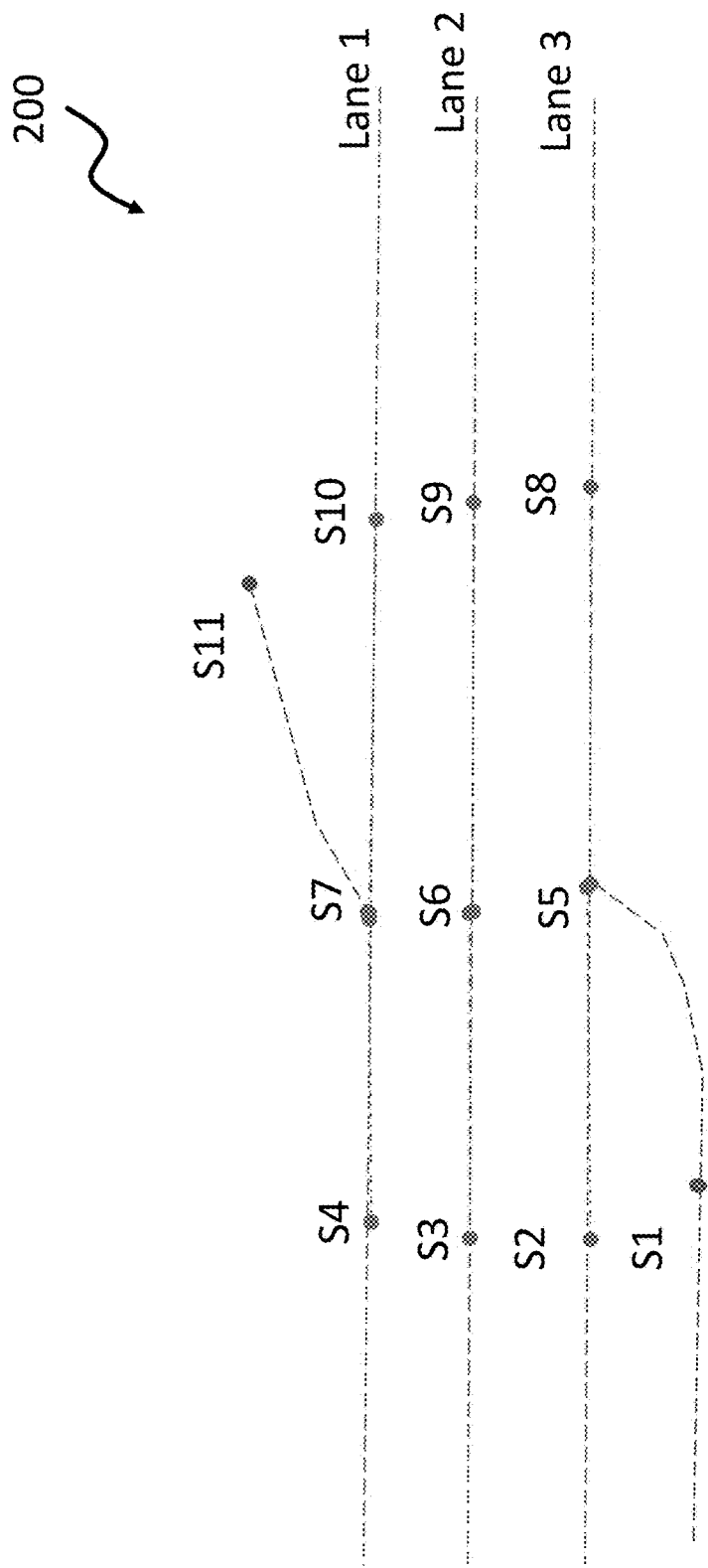

FIGS. 7A to 7C are diagrams illustrating the operations of the lane segment construction circuit 508 and the lane graph construction circuit 510 in accordance with an embodiment of the present disclosure. Referring to FIG. 7A in conjunction with FIG. 6B, starting from the end point B of the incident polyline segment (e.g., the polyline segment PS2), instead of selecting the candidate polyline segment which has maximal angle between the incident polyline segment and itself, the candidate polyline segment which has minimal angle is selected. More specifically, for the polyline segment PS2, the polyline segment PS3 has a smaller angle (i.e., the angle α) than the polyline segment PS4 (i.e., the angle β) Therefore, the polyline segment PS3 is selected. Next, the selection is performed at the end point D of the polyline segment PS3. As mentioned in the description of FIG. 6B, the arrow pointing from the end point B to the end point D is removed while the arrow pointing from the end point D to the end point B remains. Those skilled in the art should readily understand the following operation, and therefore the detailed description is omitted here for brevity. After the selection is back on the end point B of the polyline segment PS2, a lane segment S1 is constructed based on its circumscribing polyline segments, and so on. For the lane segment S1, both arrows shown on the polyline segment PS1 and PS2 are removed. The other two polyline segments constituting the lane segment S1 marked by only one arrow for constructing other lane segments adjacent to the lane segment S1. In FIG. 7B, all the lane segments (e.g., the lane segments S1 to S11) are constructed by the lane segment circuit 508. As shown in FIG. 7B, when all the lane segments are constructed, there is no arrow remaining.

Next, when a lane segment whose backward boundary is overlapped with at least a part of the forward boundary of another lane segment, the lane segment and said another lane segment are considered to be located in the same lane. As mentioned in the description of FIG. 4, the left-hand side of FIG. 7B is considered as the front of each lane while the right-hand side of FIG. 7B is considered as the back of each lane. With such configurations, the backward boundary M of the lane segment S3 shown in FIG. 7B is overlapped with the forward boundary N of the lane segment S6. Therefore, the lane segments S3 and S6 are determined to be located in the same lane.

In addition, when a lane segment whose left boundary is overlapped with at least a part of the right boundary of another lane segment, the lane segment and the said another lane segment are considered to be located in different lanes. Likewise, when a lane segment whose right boundary is overlapped with at least a part of the left boundary of another lane segment, the lane segment and the said another lane segment are considered to be located in different lanes. For example the left boundary L of the lane segment S3 is overlapped with the right boundary R of the lane segment S2. Therefore, the lane segments S3 and S2 are determined to be located in different lanes. In some embodiments, after the lane segments are constructed into lanes, the forward and backward boundaries of each lane segment may be removed from the map such that each lane is illustrated as a contiguous lane space defined by a left boundary and a right boundary.

Following the aforementioned operations, the lane segments (e.g., the lane segments L1 to S11) shown in FIG. 7B are converted into the lane graph representation of the lanes L1 to L3 shown in FIG. 7C. For example, the lane graph is formed by nodes representing respective lane segments, and information of each lane (e.g., lane L1) is constructed by the connecting relationships between the nodes of the lane segments constituting the respective lane with a proper order, e.g., the sequential connection of nodes S4, S7 and S10 for the lane L1. Accordingly, the lane geometry data LGD is constructed. With the lane geometry data LGD, the automobile is able to acquire the route of the road 200.

Figure 8:
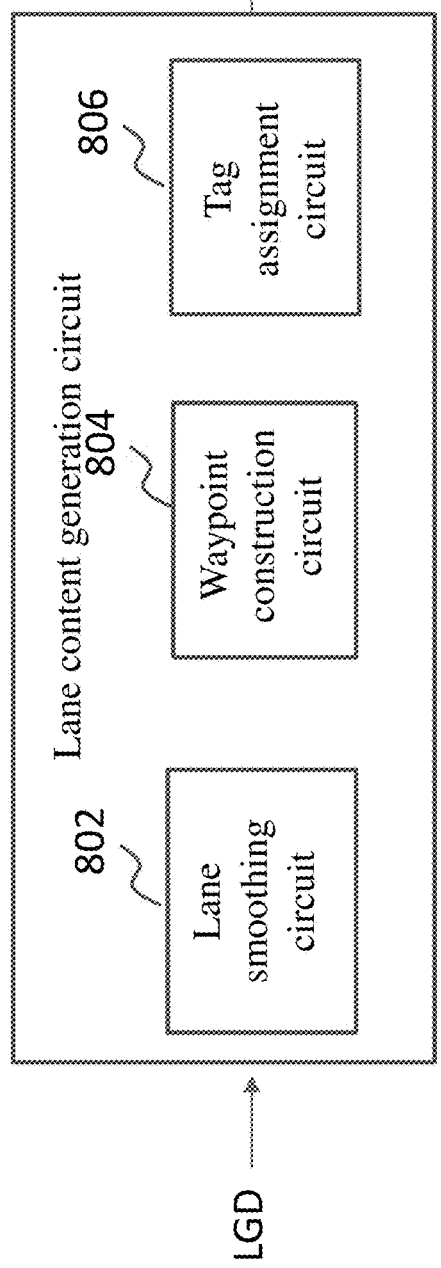
FIG. 8 is a diagram illustrating a lane content generation circuit in accordance with an embodiment of the present disclosure.
Figure 9:
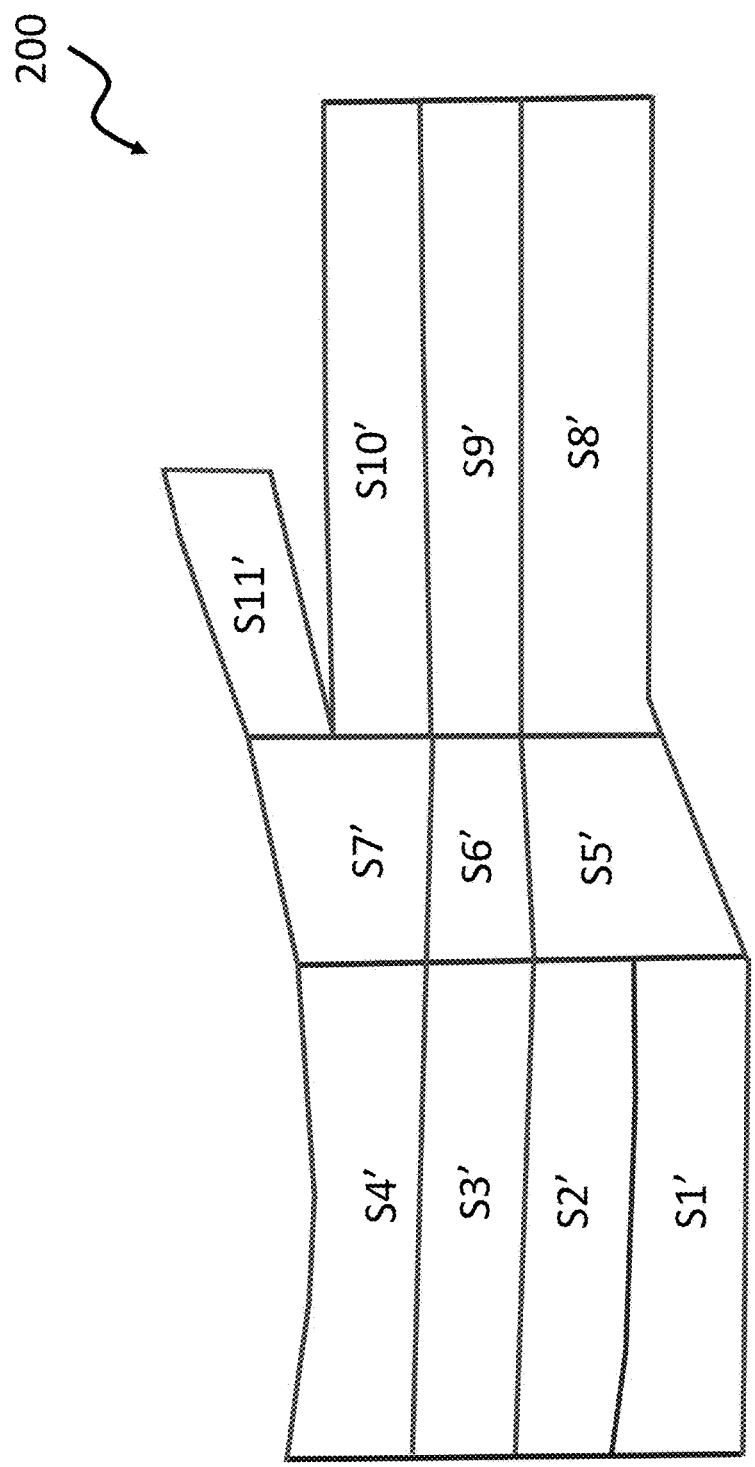
FIG. 9 is a diagram illustrating lane segments after being smoothed by a lane smoothing circuit in accordance with an embodiment of the present disclosure.

FIG. 8 is a diagram illustrating the lane content generation circuit 150 in accordance with an embodiment of the present disclosure. As shown in FIG. 8, the lane content generation circuit 150 includes a lane smoothing cirucit 802, a waypoint constuction cirucit 804 and a tag assignment circuit 806. The lane smoothing circuit 802 is arranged to smooth the polyline segments (e.g., the lane segments S1 to S11 shown in FIG. 7B) as sides of the lane segments. FIG. 9 is a diagram illustrating the lane segments after being smoothed by the lane smoothing circuit 802 in accordance with an embodiment of the present disclosure. Compared to the lane segments S1 to S11 shown in FIG. 7B, the boundaries of each of the lane segments S1' to S11' shown in FIG. 9 are clearly smoothed. In some embodiments, the lane smoothing circuit 802 utilizes a cubic B-spline transformation to smooth the lane segments S1 to S11. In some embodiments, the lane smoothing circuit 802 reconstructs the lane segments by a plurality of connected data points. In addition, the left boundary and the right boundary of each lane segment (e.g., the lane segments S1' to S11') formed of the plurality of connected data points are extracted for the operation of the waypoint construction circuit 804, wherein the waypoint construction circuit 804 is arranged to generate a plurality of waypoints for each of the lanes (e.g., the lanes L1 to L3) in a space between positions of the left boundary data and the right boundary data.

Figures 10A, 10B:
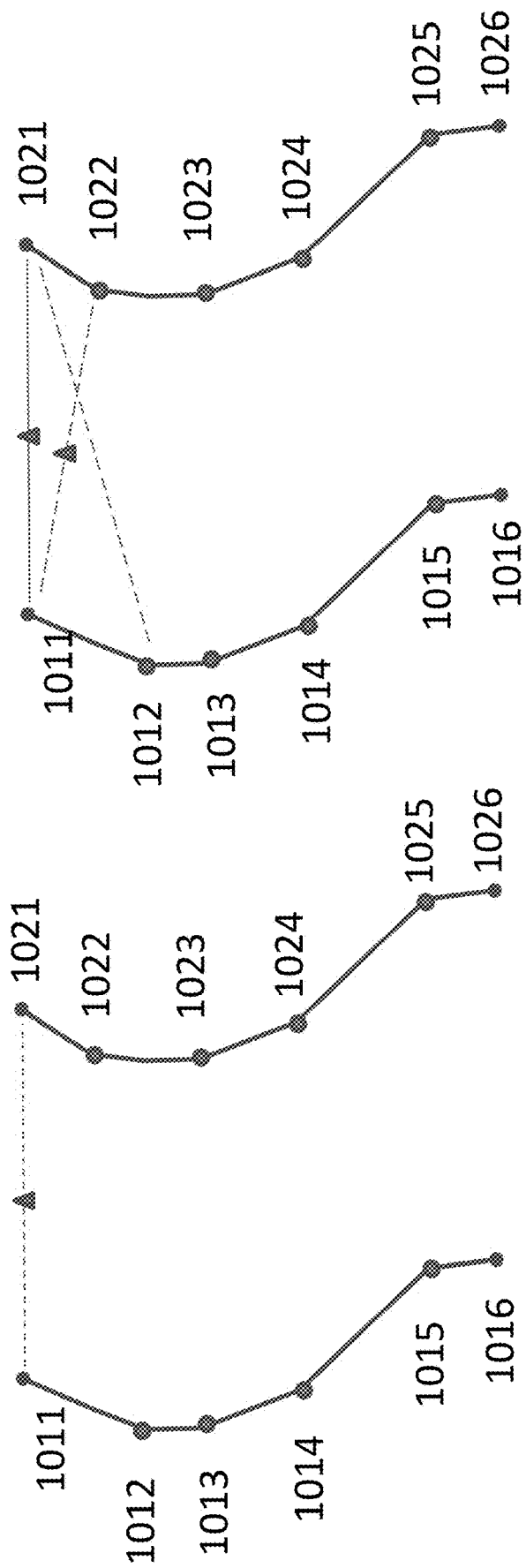
FIG. 10A to FIG. 10D are diagrams illustrating the operations of a waypoint construction circuit in accordance with an embodiment of the present disclosure.

FIG. 10A to FIG. 10D are diagrams illustrating the operation of the waypoint construction circuit 804 in accordance with an embodiment of the present disclosure. As shown in FIG. 10A, a left boundary of a lane segment is formed by connected data points 1011 to 1016, while a right boundary of the lane segment is formed by connected data points 1021 to 1026. The left boundary shown in FIGS. 10A to 10D is formed by the left boundaries of those lane segments located in the same lane. Likewise, the right boundary shown in FIGS. 10A to 10D is formed by the right boundaries of the lane segments located in said same lane. First, the waypoint construction circuit 804 extracts the connected data points 1011 and 1021, and calculates a midpoint between the connected data points 1011 and 1021 as a first waypoint, which is marked by a triangle in FIG. 10A. Second, in FIG. 10B, the waypoint construction circuit 804 selects two hypothetical lines sharing one of the connected data points 1011 and 1021. For example, the waypoint construction circuit 804 extracts the connected data points 1011 and 1022, and calculates a length between the connected data points 1011 and 1022. In addition, the waypoint construction circuit 804 extracts the connected data points 1012 and 1021, and calculates a length between the connected data points 1012 and 1021. Next, the waypoint construction circuit 804 compares the length between the connected data points 1011 and 1022 and the length between the connected data points 1012 and 1021, and determines the shorter one. For example, the length between the connected data points 1011 and 1022 is shorter in FIG. 10B. The waypoint construction circuit 804 calculates a midpoint between the connected data points 1011 and 1022 as a second waypoint, which is marked by a triangle in FIG. 10B.

Figures 10C, 10D:
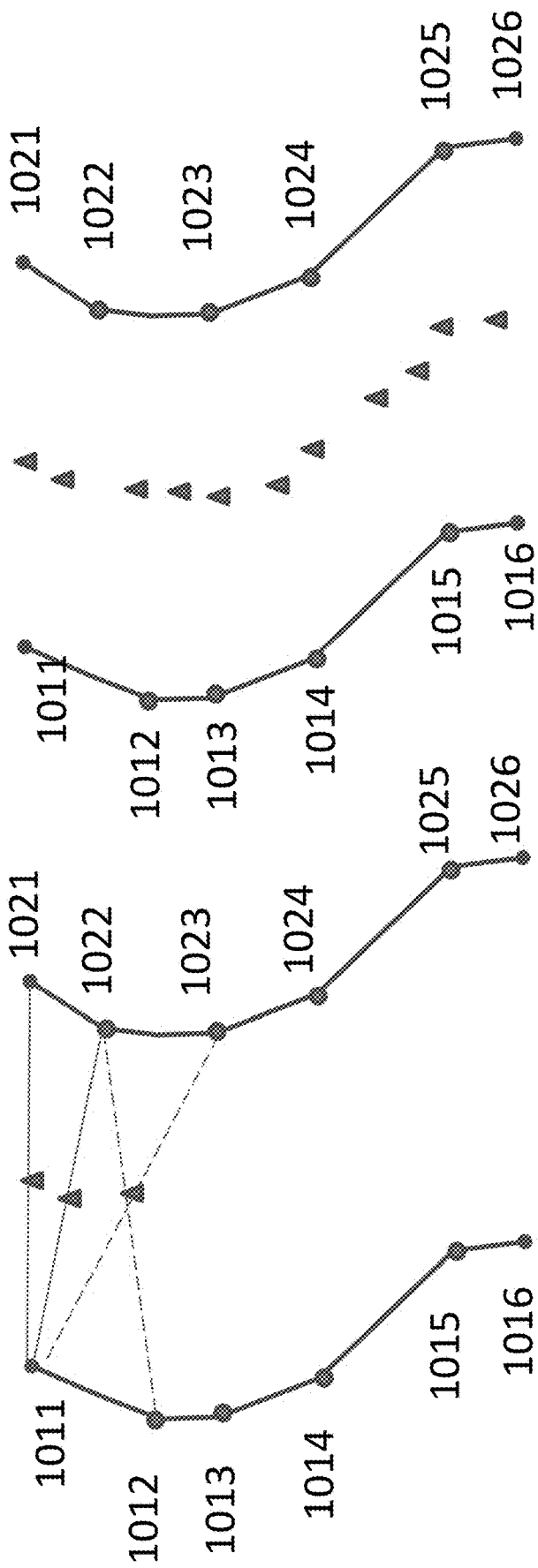

Third, in FIG. 10C, based on the updated base line formed by the connected dots 1011 and 1022, the waypoint construction circuit 804 extracts the connected data points 1011 and 1023, and calculates a length between the connected data points 1011 and 1023. In addition, the waypoint construction circuit 804 extracts the connected data points 1012 and 1022, and calculates a length between the connected data points 1012 and 1022. Next, the waypoint construction circuit 804 compares the length between the connected data points 1011 and 1023 and the length between the connected data points 1012 and 1022, and determines the shorter one. For example, the length between the connected data points 1011 and 1023 is shorter in FIG. 10C. The waypoint construction circuit 804 calculates a midpoint between the connected data points 1011 and 1023 as a third waypoint, which is marked by a triangle in FIG. 10C, and so on, until the midpoint between the connected data points 1016 and 1026 is visited. Finally, the waypoint construction circuit 804 generates all the waypoints in the lane segment as shown in FIG. 10D. With all the waypoints, the automobile is able to drive in the middle of the lane to avoid the deviation. Optionally, the waypoint construction circuit 804 is further arranged to replace the plurality of waypoints calculated in FIG. 10C with a plurality of smoothed waypoints by performing up-sampling and data smoothing for the plurality of waypoints. With such configurations, the smoothed waypoints facilitate the autopilot system of the automobile.

Figure 11:
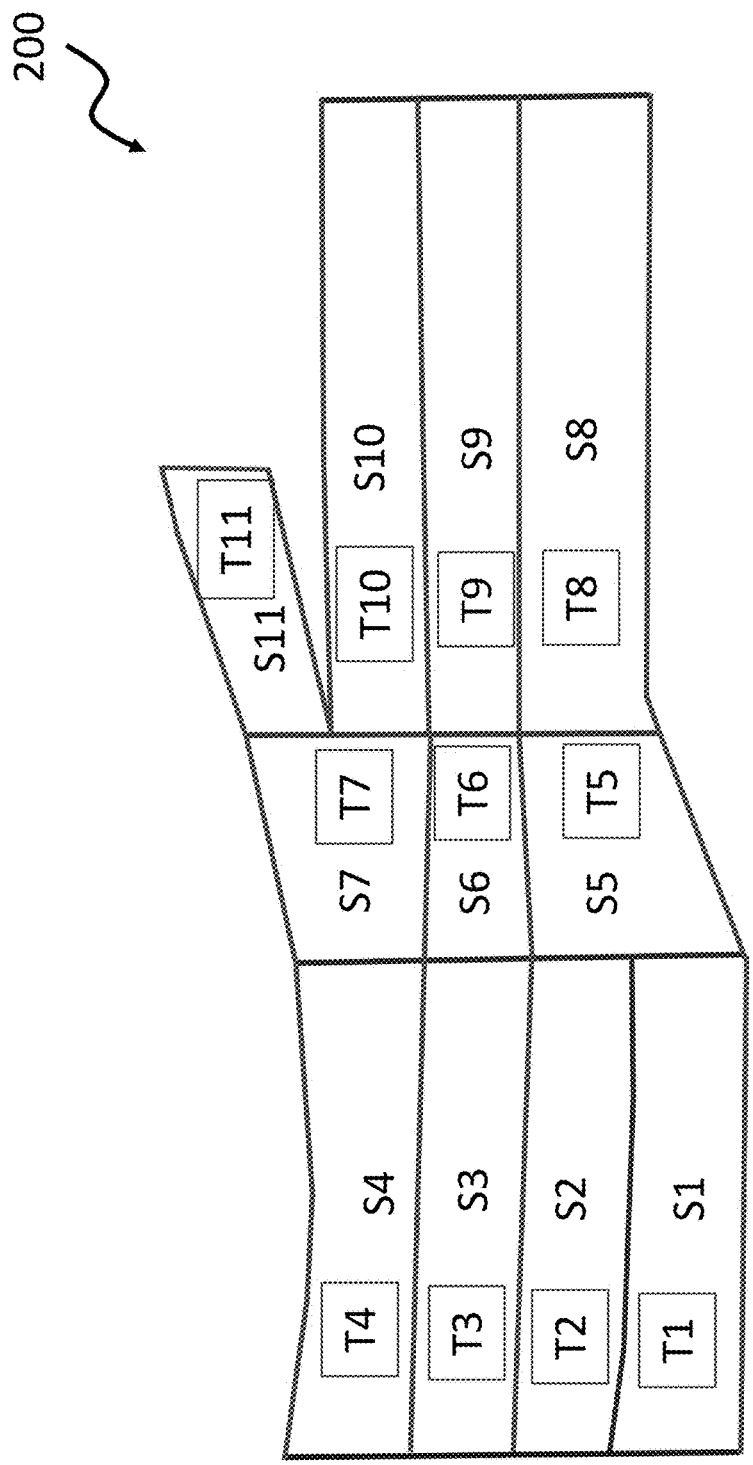
FIG. 11 is a diagram illustrating the operation of a tag assignment circuit in accordance with an embodiment of the present disclosure.

FIG. 11 is a diagram illustrating the operation of the tag assignment circuit 806 in accordance with an embodiment of the present disclosure. The tag assignment circuit 806 is arranged to associate a traffic tag T1 to T11 with the lane segment S1' to S11'. In some embodiments, the traffic tags T1 to T11 are mile markers or speed limit signs for the driver's reference. However, the type of the traffic tags T1 to T11 is not limited by the present disclosure. Accordingly, the lane content LC includes the lanes which include constituting lane segments as shown in FIG. 7C, the waypoints of lanes calculated in FIGS. 10A to 10D, and the auxiliary factor such as the traffic tag shown in FIG. 11 for the respective lane generated.

Figure 12:
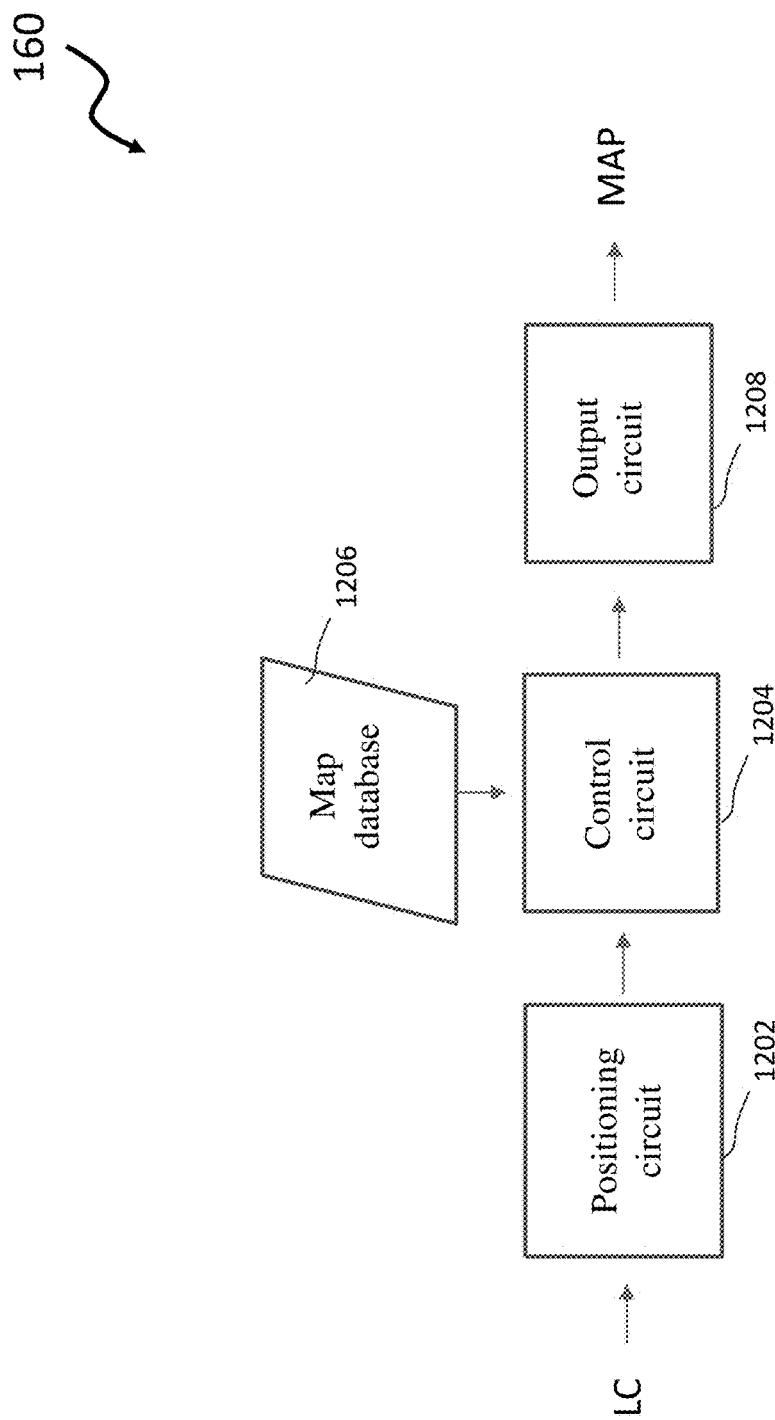
FIG. 12 is a diagram illustrating a map extraction circuit in accordance with an embodiment of the present disclosure.

FIG. 12 is a diagram illustrating the operation of the map feature extraction circuit 160 in accordance with an embodiment of the present disclosure. The map feature extraction circuit 160 is arranged to retrieve the lane content LC. As shown in FIG. 12, the map feature extraction circuit 160 includes a positioning circuit 1202, a control circuit 1204, a map database 1206 and an output circuit 1208. The positioning circuit 1202 is arranged to receive coordinates of a location of the automobile. The map database 1206 is arranged to store a grid data of a range covering the road 200. The grid data includes an array of grids, wherein each grid is associated with a list including none or at least one of the lane segments (e.g., the lane segments S1' to S11') intersecting the respective grid. The control circuit 1204 is arranged to identify a grid including the location of the automobile based on the grid data, and to identify a target grid that has an associated list including at least one of the lane segments as first lane segment(s). The output circuit 1208 is arranged to output a first lane segment group including the at least one of the lane segments associated with the target grid.

Figure 13:
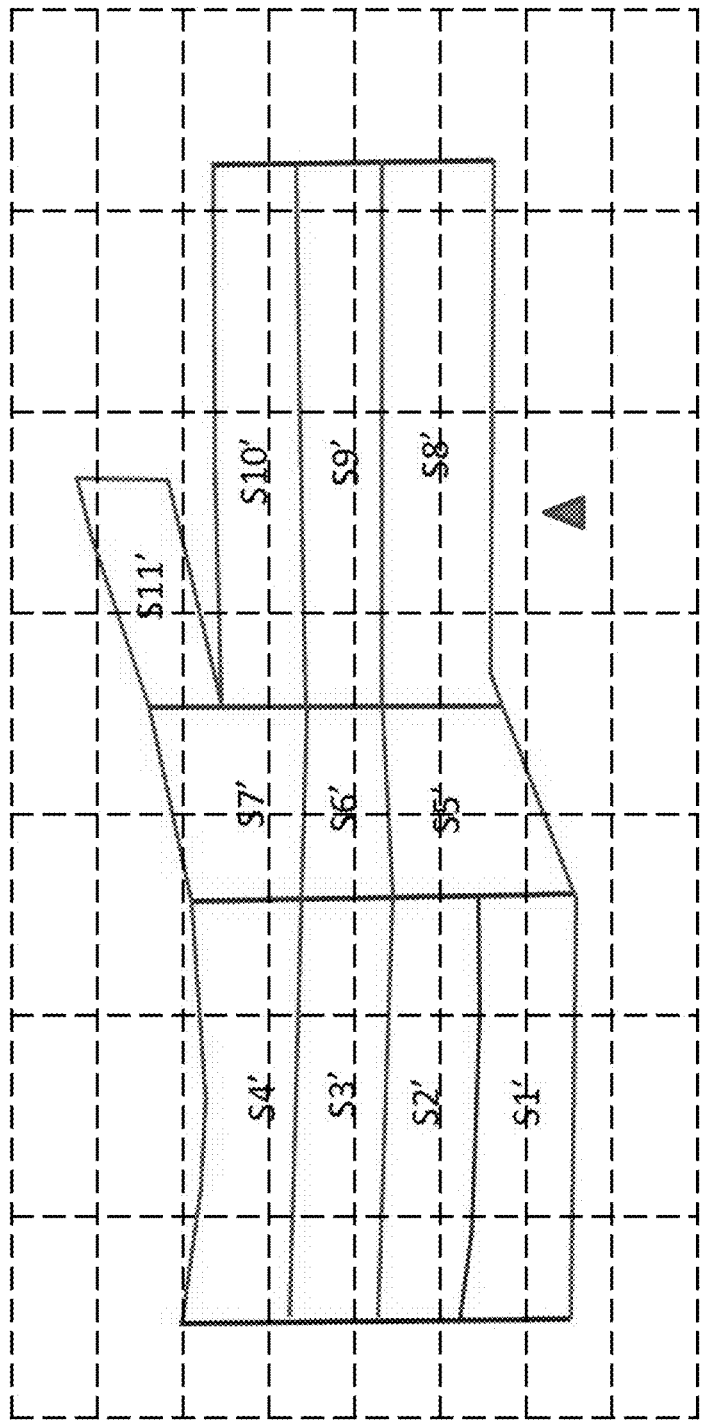
FIG. 13 is a diagram illustrating the operations of a positioning circuit, a control circuit and an output circuit in accordance with an embodiment of the present disclosure.

FIG. 13 is a diagram illustrating the operations of the positioning circuit 1202, the control circuit 1204 and the output circuit 1208 in accordance with an embodiment of the present disclosure. As shown in FIG. 13, the grid data includes an array of grids including 7 columns and 8 rows. Each grid is associated with a list including none or at least one of the lane segments intersecting the respective grid. For example, the grid located in the first column and the fourth row is associated with a list that includes the lane segments S3' and S4'. On the other hand, the grid located in the first column and the first row is associated with a list that includes no lane segment.

The positioning circuit 1202 receives coordinates of the location of the automobile, which is marked as a triangle in FIG. 13. In one embodiment, the positioning circuit 1202 receives coordinates of the location of the automobile by receiving a satellite positioning signal and converting the satellite positioning signal into the coordinates. Next, the control circuit 1204 identifies a grid including the location of the automobile based on the grid data. More specifically, the control circuit 1204 identifies that the automobile is in the grid, and the grid is located in the fifth column and the seventh row. In addition, the control circuit 1204 identifies a target grid that has an associated list including at least one of the lane segments as first lane segment(s). In one embodiment, the control circuit 1204 determines a search radius and identifies the target grid, wherein a distance between the first grid and the target grid is less than the search radius, wherein the distance is measured between respective vertices of the target grid and the grid including the automobile. In another embodiment, the control circuit 1204 sorts the array of grids based on distances between each of the grids and the grid including the automobile, and identifies the target grid based on an ascending order of the distances. In other words, the control circuit 1204 finds the lane segment closest to the automobile, and identifies the grid in which the closest lane segment is located. For example, the closest lane segment to the automobile is the lane segment S8', and the lane segment S8' is located in the grid in the fifth column and the sixth row. Therefore, the grid located in the fifth column and the sixth row is regarded as the target grid. Next, the output circuit 1208 outputs the information of the lane segment S8'. With such configurations, the automobile is able to determine the closest way to get on the road 200. Optionally, when the lane segment S8' is outputted, lane segments adjacent to the lane segment S8', i.e., the forward lane segment, the backward lane segment, the left lane segment and the right lane segment with respect to the lane segment S8', are outputted. With such configurations, the automobile can easily find an entrance for entering the road 200.

Figure 14:
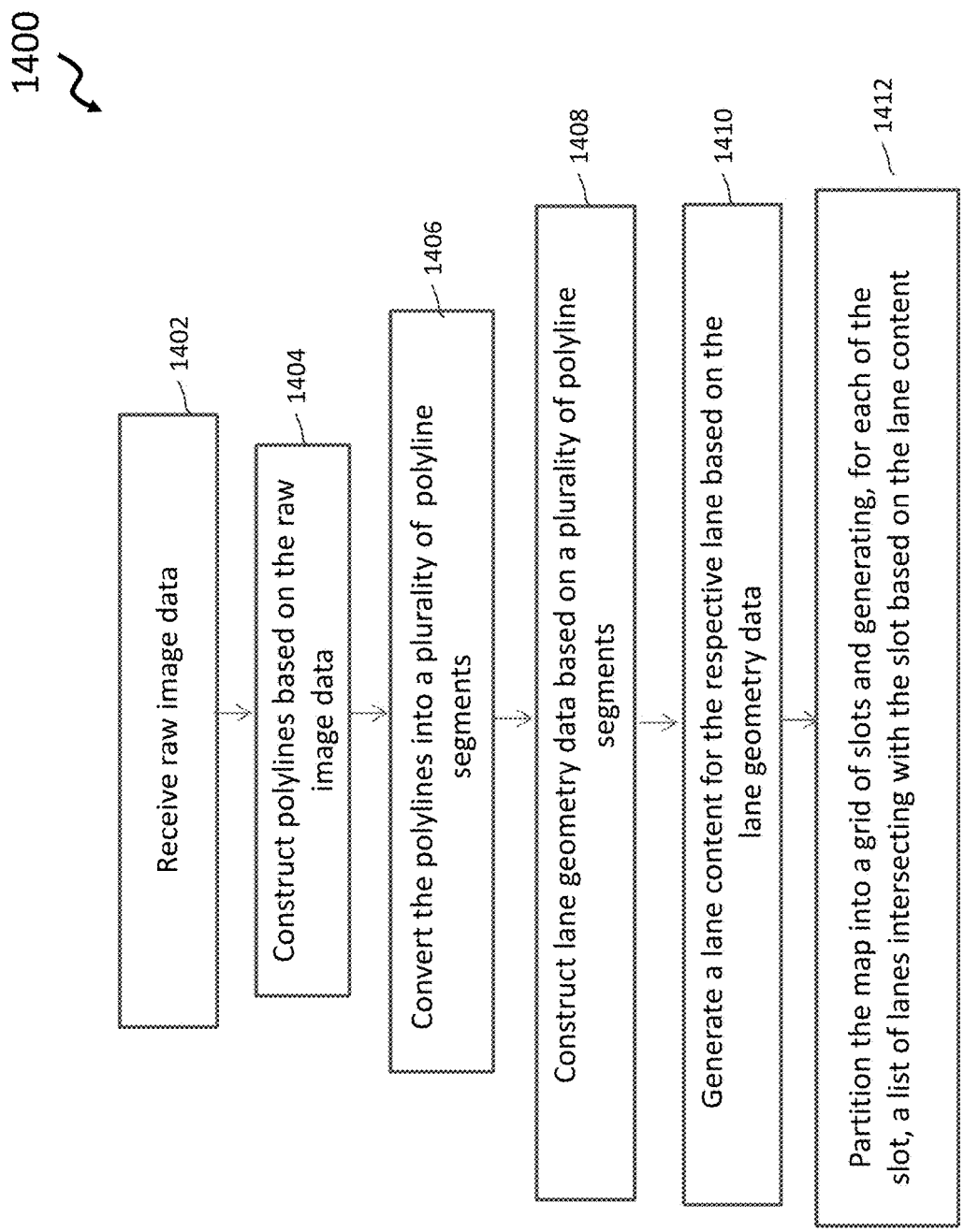
FIG. 14 is a flowchart illustrating a method of constructing a map including a plurality of lanes in accordance with an embodiment of the present disclosure.

FIG. 14 is a flowchart illustrating a method 1400 of constructing a map including a plurality of lanes in accordance with an embodiment of the present disclosure. Provided that the results are substantially the same, the steps shown in FIG. 14 are not required to be executed in the exact order shown. The method 1400 is summarized as follows.

Step 1402: Receive raw image data.

Step 1404: Construct polylines based on the raw image data.

Step 1406: Convert the polylines into a plurality of polyline segments.

Step 1408: Construct lane geometry data based on a plurality of polyline segments.

Step 1410: Generate a lane content for the respective lane based on the lane geometry data.

Step 1412: Generate a lane content for the respective lane based on the lane geometry data.

Step 1414: Partition the map into a grid of slots and generate, for each of the slots, a list of lanes intersecting with the slot based on the lane content.

Those skilled in the art should readily understand the detail of the method 1400 after reading the embodiments of FIG. 1 to FIG. 13. The detailed description is omitted here for brevity.

Figure 15:
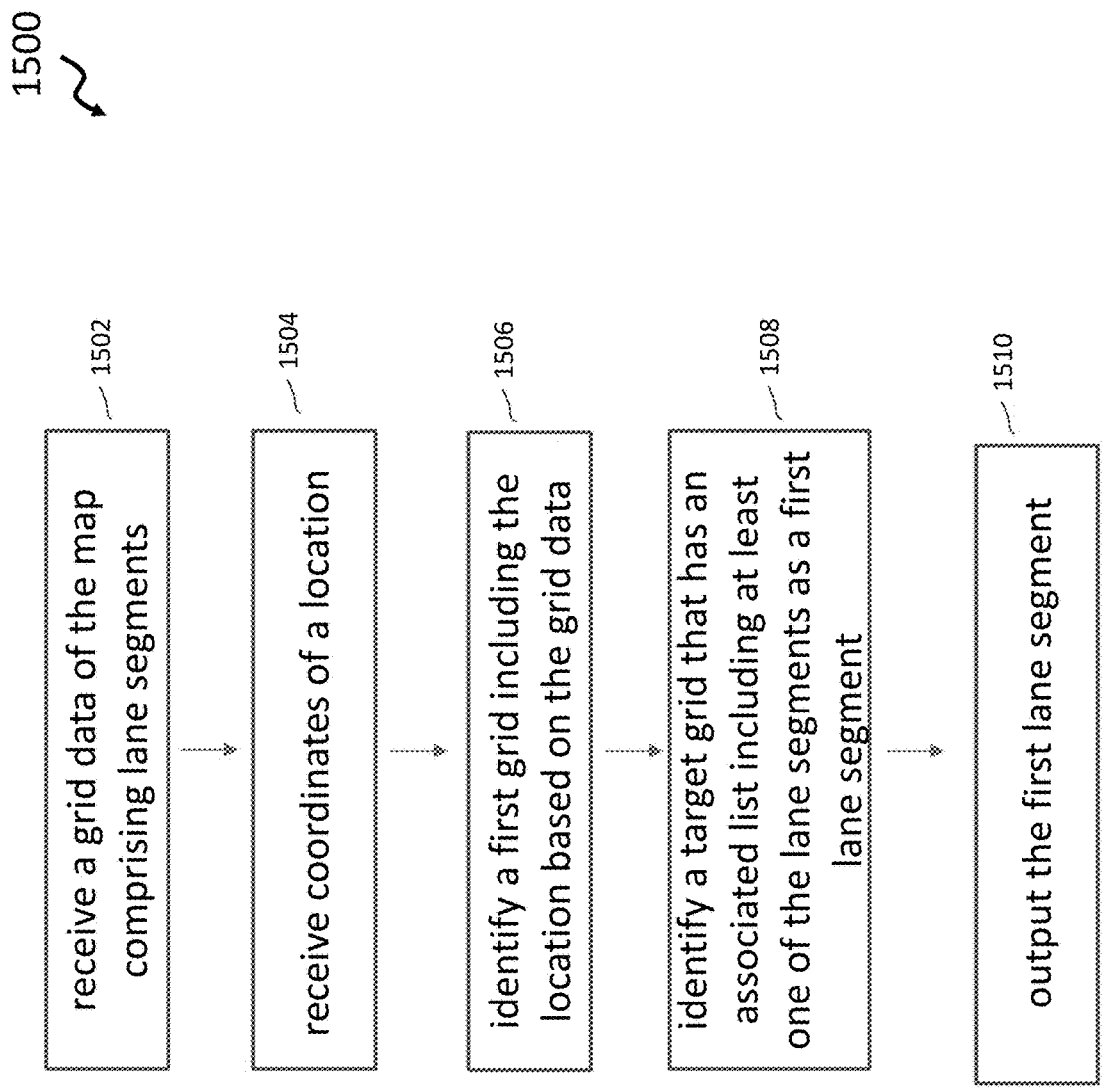
FIG. 15 is a flowchart illustrating a method of constructing a map including a plurality of lanes in accordance with another embodiment of the present disclosure.

FIG. 15 is a flowchart illustrating a method 1500 of constructing a map including a plurality of lanes in accordance with another embodiment of the present disclosure. Provided that the results are substantially the same, the steps shown in FIG. 15 are not required to be executed in the exact order shown. The method 1500 is summarized as follows.

Step 1502: receive a grid data of the map comprising lane segments.

Step 1504: receive coordinates of a location.

Step 1506: identify a first grid including the location based on the grid data.

Step 1508: identify a target grid that has an associated list including at least one of the lane segments as a first lane segment.

Step 1510: output the first lane segment.

Those skilled in the art should readily understand the detail of the method 1500 after reading the embodiment of FIG. 13, and therefore the detailed description is omitted here for brevity.

Figure 16:
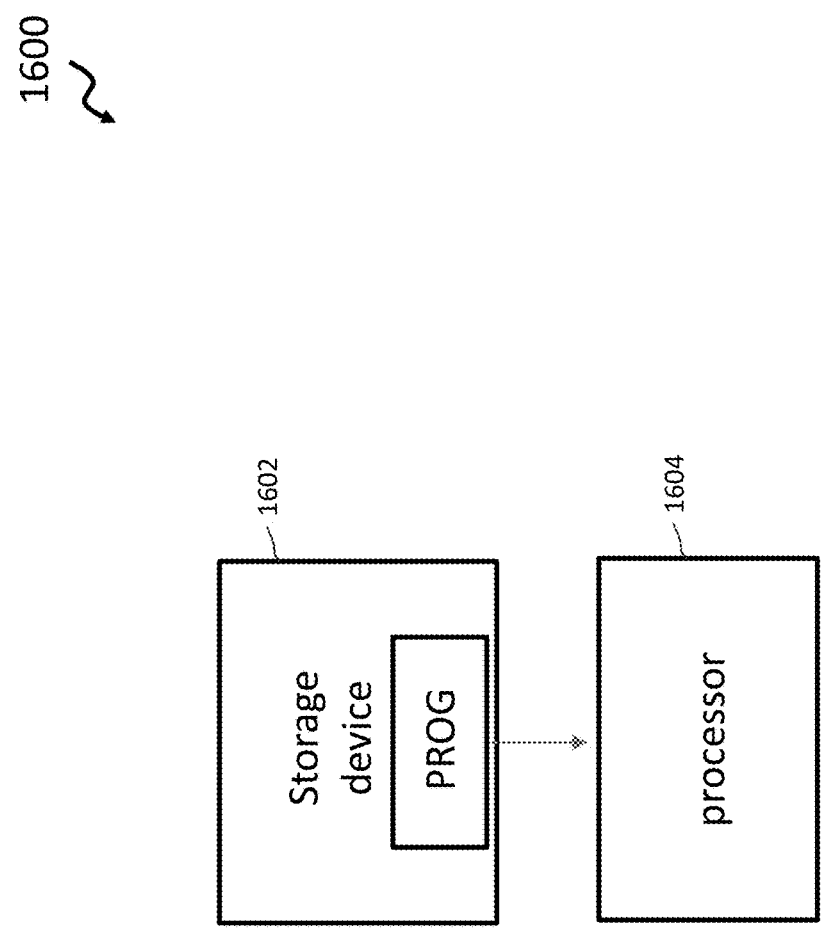
FIG. 16 is a diagram illustrating a system for constructing a map in accordance with another embodiment of the present disclosure.

FIG. 16 is a diagram illustrating a system 1600 for constructing a map in accordance with another embodiment of the present disclosure. As shown in FIG. 16, the system 1600 includes a storage device 1602 and a processor 1604. It should be noted that, in other embodiments, the system may include more than one processor, and the number of processors should not be limited by the present disclosure. The storage device is arranged to store a programming code PROG. When the programming code PROG is executed by the processor 1604, the method 1400 or the method 1500 is executed. Those skilled in the art should readily understand the operation of the processor 1604 after reading the aforementioned embodiments. The detailed description is omitted here for brevity.

What is claimed is:

1. A method of map construction, comprising:
   constructing an outline circumscribing a plurality of lanes on a road based on a plurality of segments that extend along the plurality of lanes or the road; and
   identifying an individual outline of each of the plurality of lanes based on the plurality of segments and the outline circumscribing the plurality of lanes,
   wherein the plurality of segments is obtained by partitioning polylines describing a shape of the road into segments that are constructed on a start point, an end point, or a turning point of the polylines.

2. The method of claim 1, wherein each of the plurality of segments is marked using arrows as a bidirectional segment.

3. The method of claim 2, further comprising:
   selecting, from the plurality of segments, a segment having a first end and a second end opposite to the first end;
   identifying, from the plurality of segments, a plurality of candidate segments having one end connected to the second end of the segment; and
   selecting a candidate segment from the plurality of candidate segments based on a comparison of an angle between the segment and each of the plurality of candidate segments, wherein the candidate segment includes a third end and a fourth end opposite to the third end, wherein the third end of the candidate segment is connected to the second end of the segment.

4. The method of claim 3,
   wherein a first angle in between the candidate segment and the segment is determined in one direction from the segment to the candidate segment, and
   wherein in response to the one direction being a counterclockwise direction, the candidate segment is selected in response to the first angle being greater than a first set of one or more angles determined respectively from the segment to one or more remaining candidate segments in the counterclockwise direction from the segment, and
   wherein in response to the one direction being a clockwise direction, the candidate segment is selected in response to the first angle being less than a second set of one or more angles determined respectively from the segment to the one or more remaining candidate segments in the clockwise direction from the segment.

5. The method of claim 3, further comprising:
   removing, from the segment, a first arrow pointing from the first end to the second end of the segment in response to the selecting the candidate segment, wherein the segment includes a second arrow pointing from the second end to the first end of the segment.

6. The method of claim 2, further comprising:
   selecting, from the plurality of segments, a segment having a first end and a second end opposite to the first end;
   identifying, from the plurality of segments, a plurality of candidate segments having one end connected to the second end of the segment;
   selecting a second candidate segment from the plurality of candidate segments based on another comparison of an angle between the segment and each of the plurality of candidate segments, wherein the second candidate segment includes a fifth end and a sixth end opposite to the fifth end, wherein the fifth end of the second candidate segment is connected to the second end of the segment.

7. The method of claim 6,
   wherein a second angle in between the second candidate segment and the segment is determined in a counterclockwise direction from the segment to the second candidate segment, and
   wherein the second candidate segment is selected in response to the second angle being less than a first set of one or more angles determined respectively from the segment to one or more remaining candidate segments in the counterclockwise direction from the segment.

8. The method of claim 7, further comprising:
   removing, from the second candidate segment, a third arrow pointing from the fifth end to the sixth end of the second candidate segment in response to the selecting the second candidate segment,
   wherein the second candidate segment includes a fourth arrow pointing from the sixth end to the fifth end of the second candidate segment,
   wherein a lane segment is determined by circumscribing the segment, the second candidate segment, and two additional segments,
   wherein each of the two additional segments have one end respectively connected to the segment and the second candidate segment, and
   wherein the two additional segments have, opposite to the one end, another end that is connected to each other.

9. A system, comprising:
   a processor; and
   a memory including processor-executable instructions that, when executed by the processor, cause the system to perform operations comprising:
   construct an outline circumscribing a plurality of lanes on a road based on a plurality of segments that extend along the plurality of lanes or the road; and
   identify an individual outline of each of the plurality of lanes based on the plurality of segments and the outline circumscribing the plurality of lanes,
   wherein the plurality of segments is obtained by partitioning polylines describing a shape of the road into segments that are constructed on a start point, an end point, or a turning point of the polylines.

10. The system of claim 9, wherein the outline forms a closed space that circumscribe the plurality of lanes.

11. The system of claim 9, wherein the processor is further configured to:

cause a vehicle to operate along a set of waypoints on a lane from the plurality of lanes, wherein the set of waypoints are calculated in a middle of the lane.

12. The system of claim 9, wherein the processor is further configured to:
   construct, for each of the plurality of lanes, lane geometry data based on the plurality of segments; and
   generate, based on the lane geometry data, a lane content that includes a graphical representation of the plurality of lanes and waypoints of the plurality of lanes.

13. The system of claim 9, wherein any segment from the plurality of segments does not cross any other segment from the plurality of segments.

14. A non-transitory computer readable storage medium comprising executable instructions that, when executed by at least one processor, cause the at least one processor to perform a method, comprising:
   constructing an outline circumscribing a plurality of lanes on a road based on a plurality of segments that extend along the plurality of lanes or the road; and
   identifying an individual outline of each of the plurality of lanes based on the plurality of segments and the outline circumscribing the plurality of lanes,
   wherein the plurality of segments is obtained by partitioning polylines describing a shape of the road into segments that are constructed on a start point, an end point, or a turning point of the polylines.

15. The non-transitory computer readable storage medium of claim 14, wherein the method further comprises:
   removing, from the plurality of segments, at least one segment having one end that is not connected to another segment.

16. The non-transitory computer readable storage medium of claim 14, wherein the method further comprises:
   merging, from the plurality of segments, at least two segments in response to determining that the at least two segments merge at only one end with each other.

17. The non-transitory computer readable storage medium of claim 14, wherein each of the plurality of lanes comprises a plurality of lane segments, wherein each lane segment is circumscribed by a set of segments from the plurality of segments.

18. The non-transitory computer readable storage medium of claim 17, wherein a first lane segment and a second lane segment from the plurality of lane segments are determined to be in a same lane in response to determining that a first boundary segment of the first lane segment overlaps with a second boundary segment of the second lane segment, wherein the first boundary segment and the second boundary segment extends perpendicular to a direction of the plurality of lanes.

19. The non-transitory computer readable storage medium of claim 17, wherein a third lane segment and a fourth lane segment from the plurality of lane segments are determined to be in different lanes in response to determining that a first boundary segment of the third lane segment overlaps with a second boundary segment of the fourth lane segment, wherein the first boundary segment and the second boundary segment extends parallel to a direction of the plurality of lanes.

20. The non-transitory computer readable storage medium of claim 17, wherein the method further comprises:
   converting the plurality of lane segments in each lane into a lane graph by connecting relationships between nodes of lane segments within a lane in an order.

* * * * *